(12) United States Patent
Willberg et al.

(10) Patent No.: US 11,939,248 B2
(45) Date of Patent: Mar. 26, 2024

(54) SYSTEM AND METHOD FOR USING SUBTERRANEAN BIOLOGICAL REACTORS

(71) Applicant: Schlumberger Technology Corporation, Sugar Land, TX (US)

(72) Inventors: Dean Michael Willberg, Tucson, AZ (US); Andrew Pomerantz, Lexington, MA (US); Thorarinn Kristjansson, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/298,011

(22) Filed: Apr. 10, 2023

(65) Prior Publication Data
US 2023/0265001 A1 Aug. 24, 2023

Related U.S. Application Data

(63) Continuation of application No. 17/251,435, filed as application No. PCT/US2019/039002 on Jun. 25, 2019, now Pat. No. 11,623,886.
(Continued)

(51) Int. Cl.
| | |
|---|---|
| C02F 11/04 | (2006.01) |
| C02F 3/28 | (2023.01) |
| C02F 103/20 | (2006.01) |
| C09K 8/582 | (2006.01) |
| C09K 8/594 | (2006.01) |
| E21B 43/22 | (2006.01) |
| E21B 43/26 | (2006.01) |
| E21B 43/38 | (2006.01) |

(52) U.S. Cl.
CPC ............ *C02F 11/04* (2013.01); *C02F 3/2866* (2013.01); *C09K 8/582* (2013.01); *C09K 8/594* (2013.01); *E21B 43/26* (2013.01); *E21B 43/38* (2013.01); *C02F 2103/20* (2013.01); *C02F 2209/02* (2013.01); *C02F 2209/03* (2013.01); *C02F 2209/06* (2013.01); *C02F 2209/10* (2013.01)

(58) Field of Classification Search
CPC ......... C02F 11/04; C09K 8/582; C09K 8/594; E21B 43/26; E21B 43/38
See application file for complete search history.

(56) References Cited

U.S. PATENT DOCUMENTS

| | | |
|---|---|---|
| 3,724,542 A | 4/1973 | Hamilton |
| 6,299,774 B1 | 10/2001 | Ainsworth |

(Continued)

OTHER PUBLICATIONS

International Search Report and Written Opinion of International Patent Application No. PCT/US2019/039002 dated Sep. 3, 2019, 6 pages.
(Continued)

*Primary Examiner* — Zakiya W Bates
(74) *Attorney, Agent, or Firm* — Jeffrey D. Frantz

(57) ABSTRACT

A system and method using a subterranean biological reactor can include a pre-reactor storage unit configured to receive a feedstock including a slurry of biologically derived material and at least one pump configured to pump the effluent from the pre-reactor storage unit. The system may include at least one wellbore containing a subterranean biological reactor configured to receive the effluent from the pre-reactor storage unit. At least a portion of the subterranean biological reactor may be configured to perform anaerobic digestion upon the effluent to generate a biogas.

20 Claims, 5 Drawing Sheets

Related U.S. Application Data

(60) Provisional application No. 62/690,145, filed on Jun. 26, 2018.

(56) References Cited

U.S. PATENT DOCUMENTS

| | | |
|---|---|---|
| 6,668,925 B2 | 12/2003 | Shaw |
| 7,297,274 B2 | 11/2007 | Wilkie |
| 7,905,683 B2 | 3/2011 | Kearney |
| 2004/0026334 A1 | 2/2004 | Soll |
| 2006/0178547 A9 | 8/2006 | Bruno |
| 2021/0122656 A1 | 4/2021 | Willberg |

OTHER PUBLICATIONS

International Preliminary Report on Patentability of International Patent Application No. PCT/US2019/039002 dated Jan. 7, 2021, 6 pages.

SYSTEM AND METHOD FOR USING SUBTERRANEAN BIOLOGICAL REACTORS

RELATED APPLICATIONS

This application is a Continuation of U.S. application Ser. No. 17/251,435, filed on Dec. 11, 2020, which is a National Stage of International Application No. PCT/US2019/039002, filed on Jun. 25, 2019, which claims the benefit of U.S. Provisional Application No. 62/690,145, filed on Jun. 26, 2018; the contents of which are incorporated herein by reference.

FIELD OF THE INVENTION

This application relates to a system and apparatus directed towards subterranean biological reactors.

BACKGROUND

The relentless focus to increase drilling and fracturing efficiency in unconventional plays has in recent years driven down the cost of oil and gas well construction. The upstream oil and gas industry has dramatically reduced drilling, construction and completion costs of on-shore unconventional and conventional wells. Even more important, the reliability and efficiency of drilling and completion practices has steadily increased, and the failure rate of completing to design continues to fall. Multistage hydraulic fracturing of horizontal wells, multi-well pad drilling, steam assisted gravity drainage ("SAGD") for heavy oil wells, and other completion strategies have changed the concept of what a productive hydrocarbon asset is and what its design looks like. Today, multi-well pads often contain four or more horizontal wells with coordinated trajectories and operations that optimize drainage of large reservoir blocks. The advantages of this type of construction for hydrocarbon production are clear—reduced surface footprints, lower equipment mobilization costs, and the ability to share surface facilities.

SUMMARY

In some embodiments, a system using a subterranean biological reactor is provided. The system may include a pre-reactor storage unit configured to receive a feedstock including a slurry of biologically derived material and at least one pump configured to pump the effluent from the pre-reactor storage unit. The system may include at least one wellbore containing a subterranean biological reactor configured to receive the effluent from the pre-reactor storage unit. At least a portion of the subterranean biological reactor may be configured to perform anaerobic digestion upon the effluent to generate a biogas.

One or more of the following example features may be included. The feedstock may include at least one of agricultural waste, sewage, manure, food processing plant waste, fermentation processes waste, municipal solid waste, biosolids, source separated organics, locally generated waste, and transported waste. The feedstock may be blended with one or more of water, microbes, nitrogen gas, chemical additives and minerals to generate chemical content suitable for the subterranean biological reactor. The feedstock may be stored on site prior to injection into the subterranean biological reactor and wherein initial stages of the anaerobic digestion occur prior to injection into the subterranean biological reactor. The at least one wellbore may include a plurality of wellbores connected by hydraulic fractures. The subterranean biological reactor may be either isolated from one or more subterranean formations or in communication with one or more subterranean formations. The at least one pump may be a positive displacement pump or centrifugal pump. The biogas may include a combination of methane, carbon dioxide and trace gas species. The subterranean biological reactor may include one or more downhole separators configured to separate out gas, solid and liquid. The system may include an agitator selected from the group consisting of downhole static mixers, casing rotation, jetting, or rotary mixers. The subterranean biological reactor may include at least one of permanently directional and operated in a backflow condition. The subterranean biological reactor may be associated with one or more downhole sensors to determine at least one of temperature, pressure, pH, and solid volume fraction. The biogas may be provided to a subterranean formation. Spent fluid and solid residues may be returned to the surface either through the at least one wellbore. The system may operate in at least one of a continuous, semi continuous, or cyclical modes.

In another example implementation, a method using a subterranean biological reactor is provided. The method may include receiving a feedstock including a slurry of biologically derived material at a pre-reactor storage unit and pumping, using at least one pump, the effluent from the pre-reactor storage unit. The method may further include receiving, at one or more wellbores containing a subterranean biological reactor, the effluent from the pre-reactor storage unit, wherein at least a portion of the subterranean biological reactor is configured to perform anaerobic digestion upon the effluent to generate a biogas.

One or more of the following example features may be included. The feedstock may include at least one of agricultural waste, sewage, manure, food processing plant waste, fermentation processes waste, municipal solid waste, biosolids, source separated organics, locally generated waste, and transported waste. The feedstock may be blended with one or more of water, microbes, nitrogen gas, chemical additives and minerals to generate chemical content suitable for the subterranean biological reactor. The method may include storing the feedstock on site prior to injection into the subterranean biological reactor and wherein initial stages of the anaerobic digestion occur prior to injection into the subterranean biological reactor. The at least one wellbore may include a plurality of wellbores connected by hydraulic fractures.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

Figure 1:
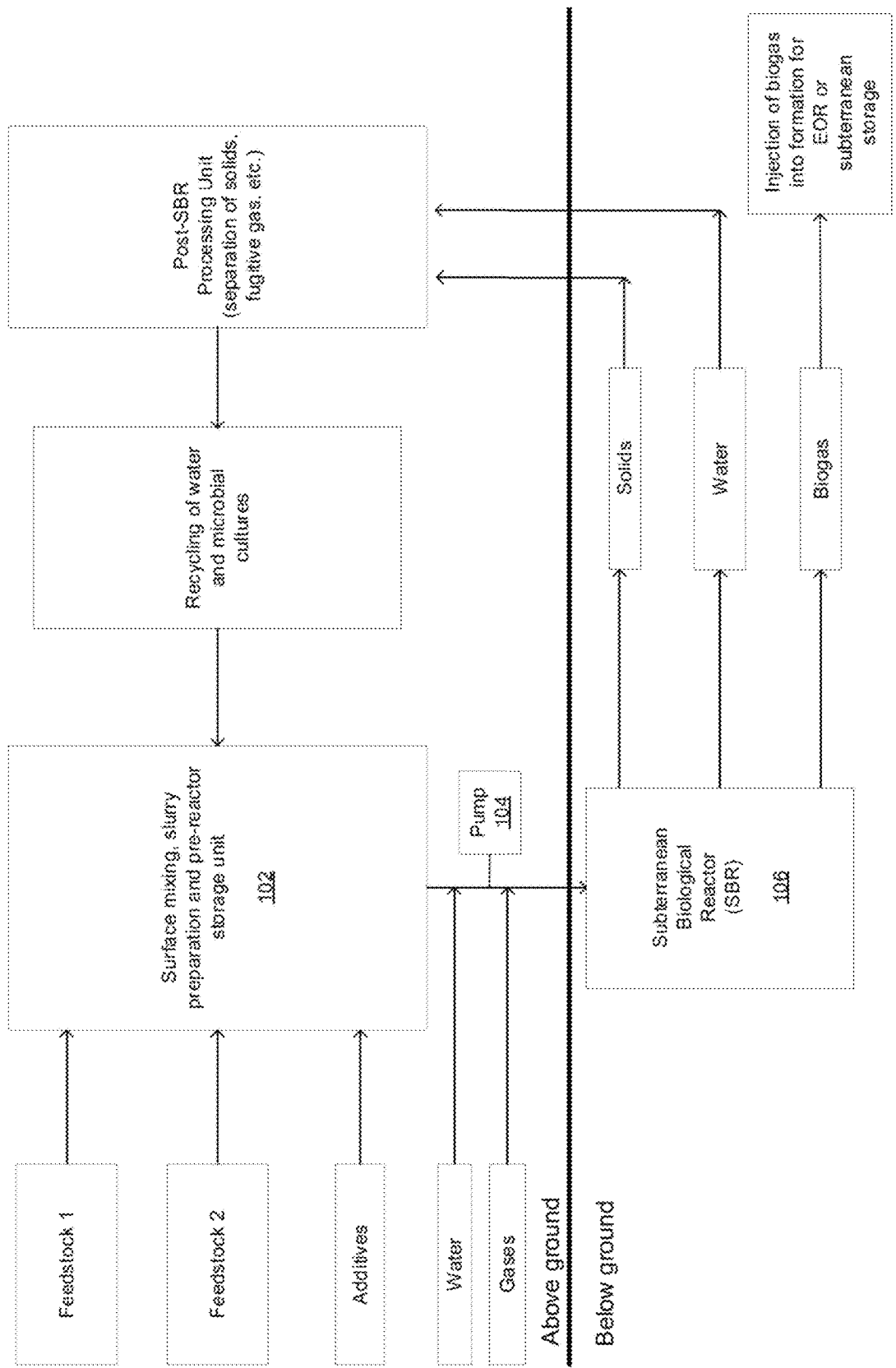
FIG. 1 illustrates a diagram of a subterranean biological reactor system in accordance with embodiments of the present disclosure.

The discussion below is directed to certain implementations and/or embodiments. It is to be understood that the discussion below may be used for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

Referring now to FIGS. 1-5, embodiments of the present disclosure are provided. Embodiments may include adapting oilfield drilling, completions, well-logging, well-intervention and integrated production management technologies to construct and operate subterranean biological reactors ("SBR"). Accordingly, embodiments included herein may be used to create useful carbon-neutral products—such as biogenic methane—from agricultural and urban waste streams. Embodiments included herein may provide cost effective enhanced oil recovery ("EOR") services for heavy oil reservoirs and may also provide cost effective methane and carbon dioxide for EOR in spent Brownfields, and in unconventional plays that are at a late stage in primary production. Embodiments included herein may be used to repurpose spent production assets (e.g., late production wells, well-pads and brownfields). Some embodiments may be used to provide value-added services including waste disposal, ground water protection, and carbon sequestration (including potentially carbon-negative technologies), while additionally delaying abandonment costs. Embodiments may be used to enable commercially viable means of exploiting low-grade geothermal energy and allow for re-locating large footprint waste treatment reactors underground.

Advances in drilling, well-construction, hydraulic fracturing and completions may be readily adapted for constructing large-volume subterranean reactors. If the structure, volumes and hydrodynamics of these reactors are optimized for microbial and biochemical operations, it is conceivable that SBR's could economically compete with—or exceed the performance of—conventional anaerobic digestion plants built on the surface. Furthermore, the scientific literature indicates that the elevated temperatures, high pressures and isolation of the subterranean environment could be an inherent advantage of SBRs over anaerobic digesters built on the surface. By strategically locating SBRs that generate biogenic methane and carbon dioxide within brownfields or heavy oil reservoirs—we could synergistically use them to drive EOR operations. Finally, by permanently storing a fraction of the organic agricultural/municipal waste the process could generate carbon storage credits.

As is discussed in further detail below, embodiments of the present disclosure include two related designs. In some embodiments, the construction and operation of a subterranean biological reactor (SBR) is disclosed. This SBR may refer to a structure within a subterranean formation into which biological material may be injected, and within which the biological material undergoes at least one of the stages of anaerobic digestion thereby producing biogas (a mixture primarily composed of methane and carbon dioxide). The SBR may be constructed and operated in many different configurations most often as some variation of a flow through reactor. Many embodiments of these SBR structures are described in further detail below.

In some embodiments, SBR's may be used to perform useful chemical processes, useful mechanical work, and or useful environmental services in the subterranean environment. These useful processes, work or services may be performed either in concert or individually, depending on the specific SBR construction and operation—the SBR can be designed for local specific needs. These processes, work and services are described in further detail below.

Anaerobic digestion is a technology that may be used in wastewater treatment facilities as a second stage following aerobic digestion. It is a complex process carried out by a consortium (community) of different anaerobic microorganisms that involves sequential hydrolysis, acidogenesis, and methanogenesis stages in the conversion of organic materials to simpler waste products—namely methane and carbon dioxide. The mass of methane produced may be significant, and is often used locally to power the waste water treatment facilities. There are commercial enterprises that may be involved with connecting anaerobic digestion produced biogas to the utilities grid.

Anaerobic digestion is an attractive candidate for adapting to use in SBR's. Anaerobic digestion has shown itself to be robust, and not sensitive to reasonable ranges of input and environmental variations. Unlike many mono-cultures, microbial consortium may be more adaptive and resilient to environmental changes. Moreover, anaerobic processes tend to generate less cell mass than aerobic processes, and may lead to better conversion efficiencies to the final bio-gas products and minimize the production of solid organic wastes. Anaerobic digestion may benefit by operating at elevated pressures and temperatures. Furthermore, surveys of black smokers and deep-ocean hydrothermal vents have shown that similar thermophilic, methanogenic, anaerobic communities exist in high-pressure extreme environments that have the potential to be harnessed for SBR's. Therefore, the subterranean environment—that may be accessed through oil and gas wells, may be a better suited location for this process than on the surface.

Embodiments of the present disclosure may be used to re-purpose recent oilfield technological developments into the creation and operation of SBR's—leveraging the unconventional oil and gas industry's experience and economies-of-scale. In some embodiments, unconventional drilling and completion techniques with minimal alteration may be used to create reactors of sufficient subterranean volume for anaerobic digestion reactor design and operations. In some embodiments, reliable and flexible wellbore and completion architectures, equipment and workflows may be employed. These technologies have many features that are useful and attractive for plug-flow anaerobic digestion reactor designs, and SBR's could benefit from the economies-of-scale already developed for unconventional oil and gas applications. The development of centralized pad facilities, high density-closely spaced drilling, and the developing technologies surrounding fracture control and monitoring all play into the design and operation of "waste-to-useful" products facilities.

In some embodiments, the determination of reactor volume—coupled with process kinetics and residence times—may be a factor in determining how effective SBR's can be at generating meaningful quantities of useful biogenic gases. The large volumes of multi-stage horizontal wellbores ("MSHW") generates significant flexibility in reactor design and operation. Currently the volume of a single MSHW wellbore can range from 32-70 $m^3$ (recent numbers from the Permian basin). The pore volumes in the hydraulic fractures are highly variable and depend on the volume of proppant pumped, but these could be in the range of 200-2000 $m^3$. This number can be increased, by placing more sand at high concentrations, or by employing a channel-fracturing technique during construction. The preliminary analysis in the waste to useful-products section below show that operationally significant quantities of biogenic gas can be created with reactors of these volumes.

In some embodiments, centralized pad facilities, high density-closely spaced wells, highly controlled fracturing programs and instrumented CT operations all could facilitate the design and operation of small footprint "waste-to-useful products" facilities. Footprint size is one of many potential advantages that SBR's may have over anaerobic digestion reactors on the surface. Furthermore, reactors that are created from two or more wellbores could substantially increase the size and efficiency of SBR's.

Referring again to FIG. 1, an embodiment depicting an example SBR consistent with the teachings of the present disclosure is provided. FIG. 1 shows a pre-reactor storage unit 102 configured to receive a feedstock including a slurry of biologically derived material. Storage Unit 102 is operably connected to at least one pump 104, which is configured to pump the effluent from pre-reactor storage unit 102 to at least one wellbore containing a subterranean biological reactor 106 configured to receive the effluent from the pre-reactor storage unit. At least a portion of the subterranean biological reactor 106 may be configured to perform anaerobic digestion upon the effluent to generate a biogas and to provide the biogas for subsequent storage. In some embodiments, the biogas may be produced to the surface and sold.

In some embodiments, the design may include an anaerobic digestion plant to be located (in part) in the subterranean environment. Deploying anaerobic digestion in SBR's in situ in oilfield reservoirs significantly boosts the value creation of anaerobic reactors. In commercial anaerobic digestion reactors methane production and biological oxygen demand ("BOD") reduction are the primary value-adding objectives. Carbon dioxide production in these reactors is a waste stream and a separations nuisance. Carbon dioxide production is a benefit for SBR's. One of the unique features of SBR's is that they could be used to generate bio-gas in situ within heavy oil or depleted brownfields for re-pressurization or EOR (methane-CO2) flood activities—while also providing a value-added service in the treatment of waste.

In some embodiments, minimizing the required hydraulic retention time ("HRT") is an important issue to address for all the embodiments included herein. The HRT in mesophilic conditions can range from 4-30 days. Thermophilic anaerobic digestion can be faster. For example, for a 1000 $m^3$ SBR operating at an HRT of 4 days—the reactor could place 8000 $m^3$ (280 MSCF) of combined $CH_4/CO_4$ into the reservoir per day. If the residence time can be shortened under thermophilic digestion regimes, or by engineering processes—then the rate of gas generation and injection could be higher.

In some embodiments, the design may be constructed in many different configurations. Some embodiments may include a feedstock comprising of a slurry containing biological derived material, for example, agricultural waste, sewage, manure, food processing plant waste, fermentation processes waste, municipal solid waste, biosolids, source separated organics, etc. The biologically derived material can be generated locally (e.g., from a local feedlot), or transported to the site. The feedstock can be raw (unprocessed manure) or it can be processed, for example, it can be ground and mixed with water. The feedstock can be a blended combination of biological sourced materials, or it can be a combination thereof.

In some embodiments, the feedstock may be blended from various sources with water, nitrogen gas, chemical additives and minerals to have the right physical properties (solids fraction, density, etc.) and the right chemical content (C, N, P, S, K salinity, pH, buffer capacity etc.) for the desired behavior in the anaerobic reactor. The feedstock may be stored on site prior to injection into the SBR. Initial stages of the anaerobic digestion may occur at the surface prior to injection into the SBR. The primary container for the SBR reactor may be a wellbore, or multiple wellbores connected by hydraulic fractures (see below). In some embodiments, the feedstock may be blended with microbes capable of performing anaerobic digestion quickly and robustly under the conditions occurring in the SBR.

In some embodiments, and depending on the specific application, the SBR reactor may either be sealed (isolated from) one or many subterranean formations, or it can be constructed to have communication with the formation (see below). The feedstock may be prepared in such a fashion that it can be pumped downhole using liquid pumps (either positive displacement or centrifugal pumps).

In some embodiments, the feedstock may undergo anaerobic digestion at some location within the SBR and generate a biogas, which may include a combination of methane, carbon dioxide and trace gas species.

In some embodiments, depending on the specific embodiment, the SBR may have downhole separators in place to separate out gas and liquid/solid streams. Downhole agitation may or may not be used. Agitation may include, but is not limited to, downhole static mixers, casing rotation, jetting, or rotary mixers.

In some embodiments, the flow-through SBR's may be designed to be permanently directional. Additionally and/or alternatively, they can be designed to be operated in a backflow condition to facilitate reactor cleaning, and to address reactor plugging.

In some embodiments, the SBR may or may not be instrumented with downhole sensors to provide important operational parameter (temperature, pressure, pH, solid volume fraction, etc.).

In some embodiments, and depending on the reactor design, the biogas may be directly collected out of the SBR for use and sold, or it may be directed into a subterranean formation. Spent fluid and solid residues may be returned to the surface either through the same wellbore or through a different wellbore. Recovered solids may be used as a soil ameliorant, or landfilled.

In some embodiments, recovered water from the process may be recycled in preparation of additional feedstock. It should be noted that the embodiments included herein may be operated in either continuous, semi continuous, or cyclical modes. For example, a pre-conditioning stage of fluid to prepare the formations water saturations (i.e. flush out excess salt) can be pumped prior to use with feedstock.

Figure 2:
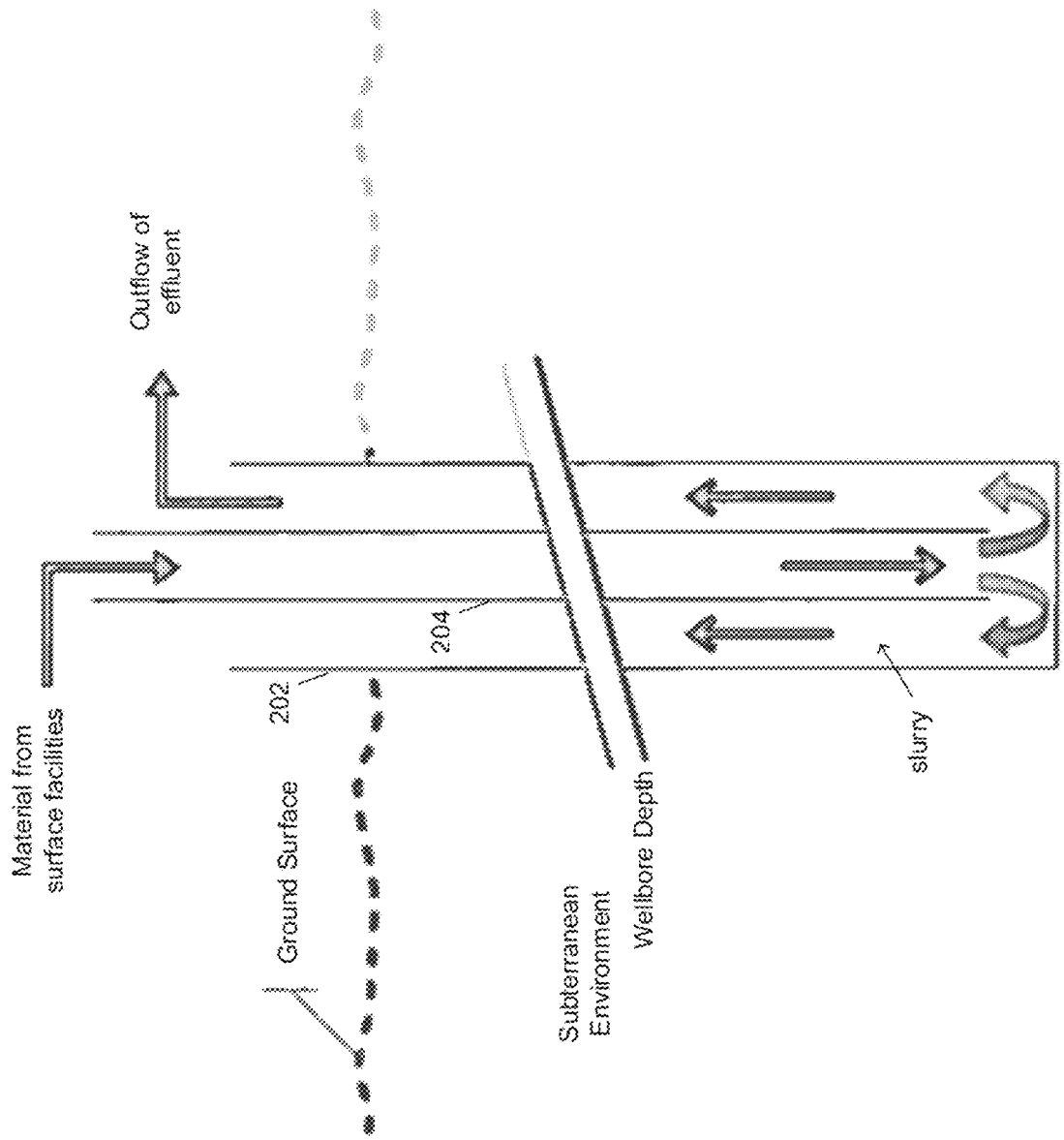
FIG. 2 illustrates a diagram of a subterranean biological reactor system showing a single wellbore isolated from the formation in accordance with embodiments of the present disclosure.

Referring now to FIG. 2, an embodiment showing a single wellbore-isolated from the formation is provided. In this particular embodiment the drilled and cased well may be used as a sealed reactor. This reactor may function as a concentric flow-through reactor, wherein everything that goes in comes back out. The casing may be cemented into the formation and no perforations, ports, slots or fractures connect the wellbore to the formation. In this situation the subterranean formation acts as a heat source or sink for the SBR, therefore providing thermal energy. The pumps and hydrostatic head provide the pressure for operation. In one variation of this embodiment, the feedstock may be pumped down the annulus at the controlled rate. The biogas, water and residual water may be produced to the surface through the installed tubing. The higher flow rates through the tubing—aided by both the lower cross-section and by the biogas provided lift will help keep the residual solids in suspension and return to the surface. Alternatively, the flow can be periodically reversed to facilitate cleaning.

Specifically, FIG. 2 depicts a vertical wellbore, however, the wellbore may also be constructed in a deviated or horizontal configuration. The system may include a cased and cemented wellbore 202, tubing 204 installed in the well bore (note that this tubing may be rotated to agitate the slurry in the annulus, inflow of material from the surface facilities, outflow of effluent, the surface of the ground, the subterranean environment, the depth of the wellbore may be designed to meet pressure, temperature requirements of the anaerobic digestion process used, the slurry is being pumped down tubing and flowing back up the annulus, in other embodiments it is possible that the flow may be reversed.

Figure 3:
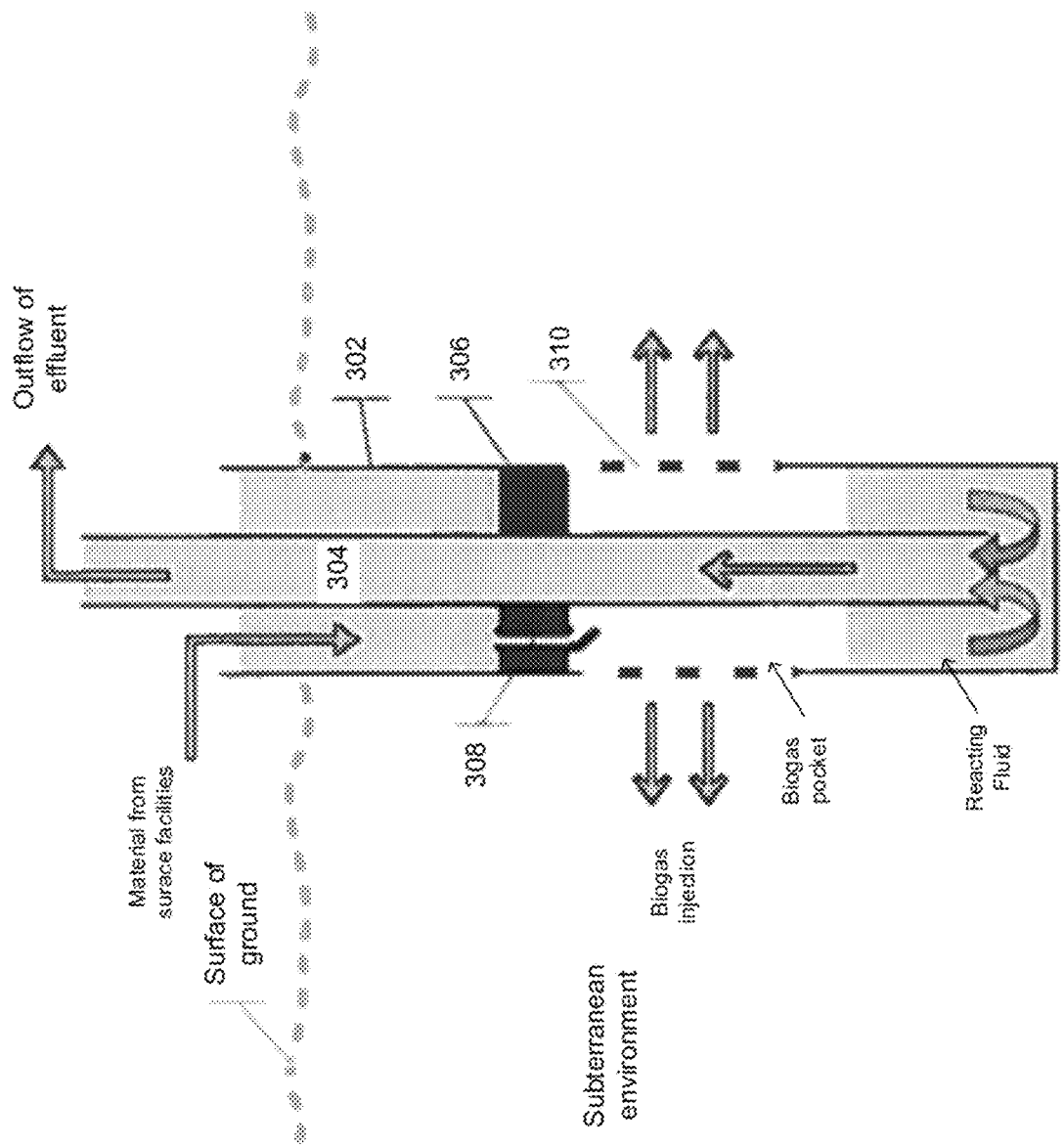
FIG. 3 illustrates a diagram of a subterranean biological reactor system showing a single wellbore connected to the formation in accordance with embodiments of the present disclosure.

Referring now to FIG. 3, an embodiment showing a single wellbore connected to the formation is provided. In this embodiment the drilled and cased well may be connected to at least one formation through perforations, ports, slotted liner, screen, gravel pack or hydraulic fractures. This reactor would still function as a concentric flow-through reactor—but some or all the biogas generated (and possibly some water as well) may be directed into the surrounding reservoir rock. In this embodiment, the subterranean formation acts as a heat source or sink for the SBR, therefore providing thermal energy to accelerate the anaerobic digestion. The pumps and hydrostatic head may provide the pressure for operation. However, in this situation the SBR is used to pressurize the formation with biogas. For this design to work, at least some level of downhole gas/liquid separation will be required. In most cases some flow of liquid would be required to carry solid residue back to the surface. It should be noted that it is not necessary that the formation which acts as the heat source and formation receiving the gas be the same formation. Gas injection could occur at a different location in the wellbore than where the anaerobic digestion is occurring.

Specifically, FIG. 3 depicts a vertical wellbore, however, the wellbore may also be constructed in a deviated or horizontal configuration. The system may include a cased and cemented wellbore 302, tubing 304 installed in the well bore (note that this tubing may be rotated to agitate the slurry in the annulus, inflow of material from the surface facilities, outflow of effluent, the surface of the ground, the subterranean environment, the region of the subterranean formation into which the biogas is being injected, a packer assembly 306, a one-way check valve 308 that allows for the working slurry to be pumped into the lower chamber, perforations 310, slotted liner or screen assembly to allow for communication between the wellbore and formation, biogas pocket in the lower chamber, reacting fluid in the lower chamber of the wellbore.

Figure 4:
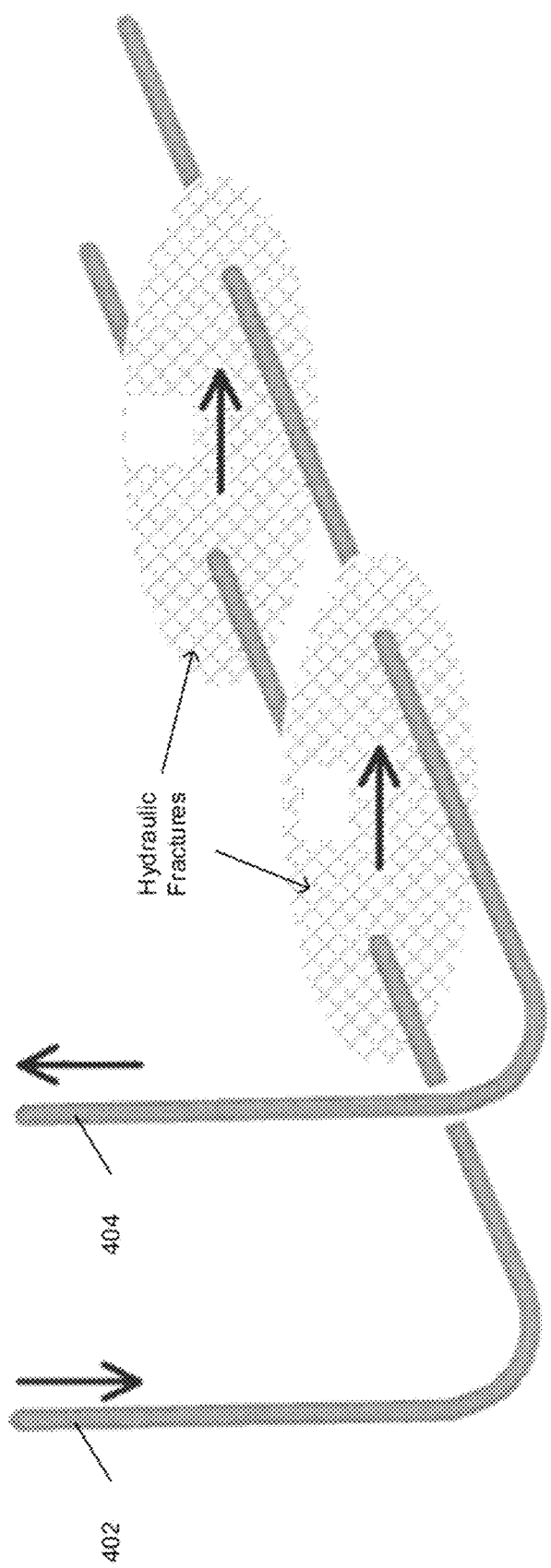
FIG. 4 illustrates a diagram of a subterranean biological reactor system showing multiple wellbores connected to the formation in accordance with embodiments of the present disclosure.

Referring now to FIG. 4, an embodiment showing a multiple wellbore configuration is provided. In this particular embodiment the SBR may be built using two or more wells (e.g., vertical, horizontal or deviated) and includes injection well 402, return well 404, and the hydraulic fractures that connect the two wells. The multiple drilled and cased wells may be connected through the formation by at least one hydraulic fractures. If the wellbores are horizontal, they may be connected by multiple hydraulic fractures. The volume of the hydraulic fractures may also greatly increase the volume of the SBR. This reactor may still function as a concentric flow-through reactor, however, some or all the biogas generated (and possibly some water as well) may be directed into the surrounding reservoir rock. In this embodiment, the subterranean formation may act as a heat source or sink for the SBR, therefore providing thermal energy to accelerate the anaerobic digestion. However, in this situation the SBR may be used to pressurize the formation with biogas through hydraulic fractures which themselves are an integral part of the reactor volume.

In some embodiments, hydraulic fracture conductivity may be a factor in the implementation of this embodiment. The hydraulic fractures may have to be created with sufficient proppant, or with channel fractures so that the solid residues from the anaerobic processes can be cleared, and returned to the surface through the return well. Since the circulating reactor fluid may come into direct contact with the formation, the properties of the formation rock may have an effect on the design and operation of this embodiment. First, the rock should not be prone to weathering in the presence of both added water and $CO_2$. Second, the chemistry of the connate water and in situ hydrocarbons must either be compatible with the microbial complex in the SBR, or the fractures may need to be pre-treated to flush away noxious chemical prior to the beginning of the anaerobic digestion process.

Figure 5:
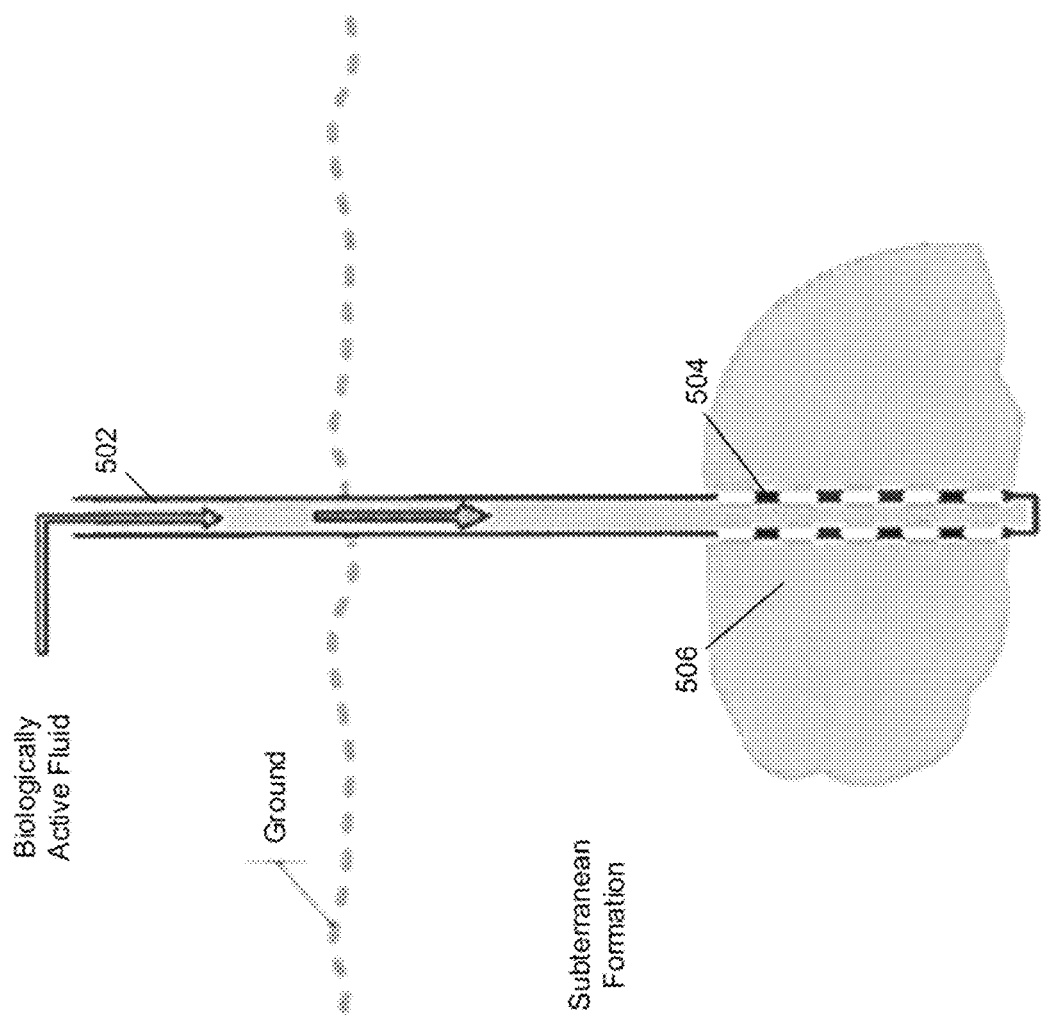
FIG. 5 illustrates a diagram of a subterranean biological reactor system showing a single use pressurization or re-pressurization squeeze in accordance with embodiments of the present disclosure.

Referring now to FIG. 5 an embodiment showing a single-use pressurization or re-pressurization squeeze is provided. In this particular embodiment, a single-use dose of feedstock and anaerobic digester culture may be injected into a wellbore and used to hydraulically fracture a formation. Here, the cased and cemented wellbore 502, the biologically active fluid is pumped at fracturing pressures into the formation, the perforations, sliding sleeves, slotted liner or other method of communication 504 between the wellbore and formation, the hydraulic fracture 506 created by the process, the ground, and the subterranean formation treated by this process. The original dose undergoes anaerobic digestion generating biogas that pressurizes the formation. This application will be helpful for pressurizing and adding gas to low pressure heavy oil wells. As such, this method could be a means of pre-treating formations for solution gas or cold heavy oil production with sand) ("CHOPS") drive mechanisms. In this embodiment, the size of the hydraulic fracturing treatment with the feedstock will have to be of sufficient size to generate a meaningful volume of gas. In some embodiments, the original fracturing slurry may be injected carrying sand or proppant so that the fracture will stay open and remain conductive. After the initial fracturing, high bio-active liquid feedstock can be continually injected into the fracture to generate even more gas. This process will likely function for a limited period till either residual solids (or cell bodies) plug up the fracture, or till waste products from the anaerobic digestion impede further cell growth.

In some embodiments, the present disclosure may include techniques for using an SBR to perform chemical processes, mechanical work, and/or useful environmental services in the subterranean environment. SBR's are versatile, and may be adapted to a number of practical applications, some of which may include, but are not limited to, generating biogas, pressurizing subterranean formations—such as for depleted brownfields and heavy oil stimulation—to enhance liquid hydrocarbon recovery, carbon storage, and enhanced use of geothermal resources.

In some embodiments, the present disclosure may be used for anaerobic digestion and biogenic gas production (no direct oilfield application). SBR's are an alternative for anaerobic digesters that are constructed on the surface, and may be operated at much higher pressures. Furthermore, by using geothermal heat they may not require additional heat sources.

In some embodiments, the present disclosure may be used for Brownfield re-pressurization, $CH_4$/$CO_2$ sweeps, and enhanced liquid hydrocarbon recovery. Pumping liquids to high pressures is less expensive than compressing gas to equivalent pressures. For example, the SBR's described above may be used to either pressurize depleted reservoirs, or serve as gas injectors for gas sweeps in enhanced oil recovery operations.

In some embodiments, the present disclosure may be used for heavy oil stimulation. For example, SBR's can be used (as described above) to charge heavy oil reservoirs with additional gas ($CO_2$ and $CH_4$) to increase pore pressure and to assist with either solution gas drive or CHOPS production.

In some embodiments, the present disclosure may be used for enhanced use of geothermal resources. There are many geothermal reservoirs that have insufficient temperature gradients to drive steam-turbine electrical generation facilities. However, these "cooler" reservoirs could be excellent candidates to drive higher rate thermophilic, anaerobic digestion SBR's at relatively shallow drilling depths.

In some embodiments, the present disclosure may be used for carbon capture and storage. Any of the embodiments described above may be used in this arrangement, where at least some of the biogas generated remains in the subterranean formation. This may occur naturally in some formations where $CO_2$ is preferentially adsorbed to kerogen and coal cleats.

In some embodiments, the present disclosure may be used for biogas produced above ground and injected into a well. In this utilization, the biogas may be produced above ground in a conventional anaerobic digester and injected into the well. The biogas may be used to increase the pressure in the reservoir and to enhance oil/gas recovery. The gas may then be brought up to the surface, a mixture of biogas and natural gas, where it may be cleaned or utilized in another manner.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

The invention claimed is:

1. A system comprising:
a pre-reactor storage unit configured to receive a feedstock including a slurry of biologically derived material;
at least one pump configured to pump effluent from the pre-reactor storage unit;
at least one wellbore containing a subterranean biological reactor configured to receive the effluent from the pre-reactor storage unit, wherein at least a portion of the subterranean biological reactor is configured to perform anaerobic digestion upon the effluent to generate a biogas, and wherein the subterranean biological reactor comprises an agitator.

2. The system according to claim 1, wherein the feedstock includes at least one of agricultural waste, sewage, manure, food processing plant waste, fermentation processes waste, municipal solid waste, biosolids, source separated organics, locally generated waste, and transported waste.

3. The system according to claim 1, wherein the feedstock is blended with one or more of water, nitrogen gas, one or more of microbes capable of performing the anaerobic digestion, chemical additives and minerals to generate chemical content suitable for the subterranean biological reactor.

4. The system of claim 1, wherein the feedstock is stored on site prior to injection into the subterranean biological reactor and wherein initial stages of the anaerobic digestion occur prior to injection into the subterranean biological reactor.

5. The system of claim 1, wherein the at least one wellbore includes a plurality of wellbores connected by hydraulic fractures.

6. The system of claim 1, wherein the subterranean biological reactor is in communication with one or more subterranean formations.

7. The system of claim 1, wherein the agitator is configured to provide agitation in an annulus between the at least one wellbore and a tubing disposed in the at least one wellbore.

8. The system of claim 1, wherein the biogas includes a combination of methane, carbon dioxide, and trace gas species.

9. The system of claim 1, wherein the subterranean biological reactor includes one or more downhole separators configured to separate out gas, solid, and liquid.

10. The system according to claim 1, wherein the agitator is configured to provide agitation via movement of a tubing disposed in the at least one wellbore, jetting, or a combination thereof.

11. The system according to claim 1, wherein the subterranean biological reactor is configured to selectively operate in a first flow direction and a second flow direction in a backflow condition, and the second flow direction is reversed relative to the first flow direction.

12. The system according to claim 1, wherein the subterranean biological reactor is associated with one or more downhole sensors to determine each of temperature, pressure, pH, and solid volume fraction.

13. The system according to claim 1, wherein the subterranean biological reactor comprises:
a packer disposed in the at least one wellbore about a tubing between an upper chamber and a lower chamber;
a valve coupled to the packer;
a reacting fluid region in the lower chamber; and
a biogas pocket in the lower chamber between the packer and the reacting fluid region, wherein the valve is configured to control flow of the effluent from the upper chamber to the lower chamber.

14. The system according to claim 1, wherein spent fluid and solid residues are returned to the surface through the at least one wellbore, and the biogas is provided to a subterranean formation.

15. The system according to claim 1, wherein the system selectively operates in continuous, semi continuous, and cyclical modes.

16. A method comprising:
receiving a feedstock including a slurry of biologically derived material at a pre-reactor storage unit;
pumping, using at least one pump, effluent from the pre-reactor storage unit;
receiving, at one or more wellbores containing a subterranean biological reactor, the effluent from the pre-reactor storage unit, wherein at least a portion of the subterranean biological reactor is configured to perform anaerobic digestion upon the effluent to generate a biogas, and wherein the subterranean biological reactor comprises an agitator.

17. The method according to claim 16, wherein the feedstock includes at least one of agricultural waste, sewage, manure, food processing plant waste, fermentation processes waste, municipal solid waste, biosolids, source separated organics, locally generated waste, and transported waste.

18. The method according to claim 16, further comprising:
   blending the feedstock with one or more of water, nitrogen gas, chemical additives, and minerals to generate chemical content suitable for the subterranean biological reactor.

19. The method of claim 16, further comprising:
   storing the feedstock on site prior to injection into the subterranean biological reactor and wherein initial stages of the anaerobic digestion occur prior to injection into the subterranean biological reactor; and
   blending the feedstock with one or more of microbes capable of performing the anaerobic digestion.

20. The method of claim 16, wherein the agitator is configured to provide agitation via movement of a tubing disposed in the one or more wellbores.

* * * * *